United States Patent [19]

Meyer et al.

[11] 4,255,560
[45] Mar. 10, 1981

[54] TRANSPARENT COPOLYAMIDES FROM 2,4'-PACM

[75] Inventors: Rolf-Volker Meyer; Rolf Dhein; Friedrich Fahnler; Dietrich Michael; Hans Rudolph; Werner Nielinger, all of Krefeld, Fed. Rep. of Germany

[73] Assignee: Bayer Aktiengesellschaft, Fed. Rep. of Germany

[21] Appl. No.: 102,987

[22] Filed: Dec. 12, 1979

[30] Foreign Application Priority Data

Dec. 23, 1978 [DE] Fed. Rep. of Germany ....... 2855928

[51] Int. Cl.$^3$ ............................................. C08G 69/26
[52] U.S. Cl. ................................. 528/339; 428/474.4; 528/338; 528/340; 528/346; 528/347; 528/349
[58] Field of Search ............... 528/346, 349, 338, 339, 528/340

[56] References Cited

U.S. PATENT DOCUMENTS 2,516,585   7/1950   Pease ..................................... 528/346

Primary Examiner—Harold D. Anderson
Attorney, Agent, or Firm—Connolly and Hutz

[57] ABSTRACT

Copolyamides with improved properties are obtained by polycondensing aliphatic and/or aromatic dicarboxylic acids with an amine mixture of diaminodicyclohexyl methanes and optionally homologous polycyclohexyl polyamines and one or more aliphatic diamines, said copolyamide being useful for the production of shaped articles such as films, sheets and injection moldings.

7 Claims, No Drawings

TRANSPARENT COPOLYAMIDES FROM 2,4'-PACM

This invention relates to thermoplastically formable copolyamides having improved fluidity and improved processability.

The known favourable combination of properties shown by standard polyamides, such as polyamide-6 or polyamide-6,6, in relation to other thermoplastically processible materials is of considerable advantage for numerous applications. Because of the partial crystallinity of these polyamides, however, which is responsible for many of the particularly favourable properties, shaped articles of these polyamides are always clouded and, for this reason, can only be used to a limited extent in cases where substantially nonopaque shaped articles are required.

Accordingly, there have been many attempts to produce polyamides which, in addition to their amorphous character and their transparency, also have the favourable properties of polyamide-6 and polyamide-6,6.

One of these attempts is based on the use of bis-(4-aminocyclohexyl)-methane in the production of polyamides. Thus, transparent polyamides of the above-mentioned amine and aromatic dicarboxylic acids, such as isophthalic acid or terephthalic acid, are known (U.S. Pat. No. 2,696,482 or U.S. Pat. No. 2,516,585). These products are, however, difficult to process thermoplastically on account of their high melt viscosity.

Attempts have also been made to produce transparent polyamides from bis-(4-aminocyclohexyl)-methane and other polyamide-forming components, such as adipic acid, hexamethylene diamine and ε-caprolactam. These polyamides are, however, extremely sensitive to solvents and form opaque spherolites.

Although the polyamides based on bis-(4-aminocyclohexyl)-propane and adipic acid which are described in DOS No. 1,595,354=GB-PS No. 1,193,487 show a lower tendency towards crystallisation, their thermoplastic processability is not very good because of their high softening points.

Lower melting polyamides of bis-(4-aminocyclohexyl)-methane and aliphatic dicarboxylic acids, such as adipic acid (U.S. Pat. No. 2,585,163), are either non-transparent or show a tendency towards post-crystallisation and, hence, towards clouding.

In the DOS No. 1,933,395=U.S. Pat. No. 3,597,400 transparent polyamides are described which have to consist of bis-(4-aminocyclohexyl)-methane and hexamethylene diamine as diamine components and isophthalic acid and terephthalic acid as dicarboxylic acids in strictly defined ratios. One particular disadvantage of these polyamides is that the bis-(4-aminocyclohexyl)-methane content may amount to only at most 50 mole percent, i.e. to at most about 65% by weight. Products having a larger bis-(4-aminocyclohexyl)-methane content have an excessively high melt viscosity, so that they cannot be formed by standard injection-moulding processes.

German Offenlegungsschrift No. 2,125,906 describes copolyamides of bis-(4-aminocyclohexyl)-methane and 3-ethyl-1,10-decane dicarboxylic acid. These transparent products have the disadvantage, however, that the 3-ethyl-1,10-decane dicarboxylic acid required is difficult to obtain.

Finally, German Offenlegungsschrift No. 2,642,244 describes transparent polyamides of bis-(4-aminocyclohexyl)-methanes, isophthalic acid and inter alia salts of aliphatic dicarboxylic acids and aliphatic diamines in which the average number of methylene groups per amide group has to amount to at least 9. It would seem, however, that due to these long-chain units, these polyamides show an inadequate resistance of their transparency in boiling water and inadequate dimensional stability under heat.

Accordingly, the hitherto proposed transparent polyamides show disadvantages in regard to chemical stability, high melt viscosity and, hence, poor processibility.

In addition, pure 4,4'-diaminodicyclohexylmethane is always used according to the prior art; only the ratios between the various stereoisomers (trans, trans; trans, cis; cis, cis) may be different. Positional-isomer diaminodicyclohexyl methanes, such as 2,4'-diaminodicyclohexyl methanes and/or 2,2'-diaminodicyclohexyl methanes, are not used.

This is all the more remarkable as, in the production of 4,4'-diaminodicyclohexylmethanes from diaminodiphenylmethanes of commercial quality, hydrogenation of the aromatic compound has to be preceded by an additional fine distillilation or a special process has to be used for producing pure 4,4'-diaminodiphenyl methane.

It has now surprisingly been found that readily processible transparent copolyamides having a favourable melt viscosity can be obtained providing cycloaliphatic amines corresponding to the following general formula:

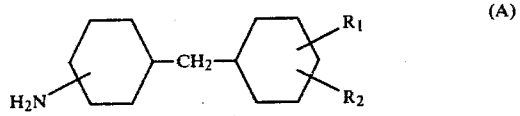

(A)

wherein
R₁ represents H or Nh₂
R₂ represents H or

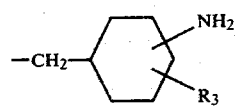

and
R₃ represents H or

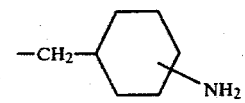

which are produced by hydrogenation of mixtures of aromatic amines obtainable by the acid condensation of aniline and formaldehyde, are used either alone or at least partly in admixture with other diamines as amine component for the polycondensation reaction.

Accordingly, the present invention relates to copolyamides obtained by polycondensing equimolar quantities of I—at least one aliphatic $C_2$–$C_{20}$ dicarboxylic acid and/or an aromatic $C_7$–$C_{20}$ dicarboxylic acid and
II—an amine mixture comprising:
  1. from 0.1 to 100 mole percent of a mixture of cycloaliphatic amines corresponding to the following general formula (A):

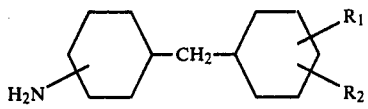

which consists of:
(a) from 0 to 3 mole percent of 4-aminodicyclohexyl methane ($R_1$ and $R_2$ represent H),
(b) from 70 to 99 mole percent, preferably from 75 to 95 mole percent of 4,4'-diaminodicyclohexylmethanes ($R_1$ represents H, $R_2$ represents $NH_2$),
(c) from 1 to 30 mole percent, preferably from 5 to 25 mole percent of 2,4'-diaminodicyclohexylmethanes ($R_1$ represents H, $R_2$ represents $NH_2$),
(d) from 0 to 2 mole percent, preferably from 0 to 1 mole percent of 2,2'-diaminodicyclohexyl methanes ($R_1$ represents H, $R_2$ represents $NH_2$) and
(e) from 0 to 15 mole percent, preferably from 0.1 to 5 mole percent of at least one polynuclear polyamine with $R_1$ representing $NH_2$ and $R_2$ representing

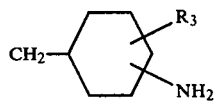

with $R_3$ defined as above,
2. from 0 to 99.9 mole percent of one or more aliphatic diamines or cycloaliphatic diamines different from (1) containing at least 6 carbon atoms in the molecule,
the sum of (1) and (2) and of (a) to (e) having to amount to 100 mole percent in each case,
with the exception of the copolyamides claimed in DOS No. 27 37 257=U.S. patent application Ser. No. 925,227, now U.S. Pat. No. 4,195,164.
According to the German Offenlegungsschrift No. 27 37 257, copolyamides are obtained by polycondensing:
(1) from 70 to 100 mole percent, preferably from 80 to 100 mole percent of a mixture of positionally isomeric diaminodicyclohexyl methanes consisting of:
  (a) from 70 to 99 mole percent, preferably from 75 to 95 mole percent of 4,4'-diamino isomers,
  (b) from 1 to 30 mole percent, preferably from 3 to 20 mole percent of 2,4'-diamino isomers,
  (c) from 0 to 2 mole percent, preferably from 0 to 1 mole percent of 2,2'-diamino isomers, and
(2) from 0 to 30 mole percent, preferably from 0 to 20 mole percent of a non-cyclic aliphatic $C_6$–$C_{12}$ diamine and/or of a cycloaliphatic $C_8$–$C_{15}$ diamine different from the diaminodicyclohexylmethanes mentioned in (1), the molar ratio of all the cycloaliphatic diamines of (1) and (2) to the non-cyclic aliphatic diamines having to amount to at least 4:1, preferably to at least 5:1 and the sum of (a)–(c) and (1)–(2) having to amount to 100 mole percent, and
(3) equivalent quantities of dicarboxylic acids consisting of:
  (d) from 50 to 100 mole percent, preferably from 70 to 85 mole percent of azelaic acid and
  (e) from 50 to 0 mole percent, preferably from 30 to 15 mole percent of isophthalic acid and/or adipic acid,
with the proviso that either the dicarboxylic acid component consists of at least two dicarboxylic acids or the diamine component consists of the isomer mixture mentioned in (1) and at least one of the diamines defined in (2).

Particularly preferred inventive polyamides are polyamides obtained by polycondensing dicarboxylic acids with an amine mixture of from 0.5 to 20 mole percent of components (1) and from 80 to 99.5 mole percent of components (2), because these products are particularly suitable for thermoplastic processing and give transparent polyamides, even in thick layers. Other suitable inventive polyamides are, in particular, polyamides obtained by polycondensing dicarboxylic acids containing from 70 to 100 mole percent of components (1) and from 0 to 30 mole percent of components (2), because these polyamides are particularly suitable for the production of transparent shaped articles having particularly high notched impact strength.

The aliphatic or cycloaliphatic dicarboxylic acids used are those containing up to 20 carbon atoms, preferably 6 to 20 C-atoms. Suitable aliphatic dicarboxylic acids are above all compounds corresponding to the following general formula:

$$HOOC-(CH_2)_m-COOH$$

wherein m represents an integer of from 4 to 10, whilst suitable cycloaliphatic dicarboxylic acids are the positional-isomeric 1,3-cyclopentane dicarboxylic acids, 1,3- and 1,4-cyclohexane dicarboxylic acid and 4,4'-dicyclohexyl dicarboxylic acids. Adipic acid and azelaic acid are particularly suitable.

The aromatic dicarboxylic acids which may be used are those containing from 7 to 20, preferably from 8 to 15 carbon atoms, for example mononuclear dicarboxylic acids of the benzene series, such as 3,5-pyridine dicarboxylic acid, 1,4-, 1,5- and other naphthalene dicarboxylic acids, 4,4'-diphenyl dicarboxylic acid, diphenyl sulphone dicarboxylic acids and benzophenone dicarboxylic acids, preferably terephthalic acid and isophthalic acid.

Mixtures of the above-mentioned dicarboxylic acids may also be used.

The content of trinuclear triamines corresponding to general formula (A) in the mixture of cycloaliphatic amines amounts to from 0 to 15 mole percent and the content of tetranuclear tetramines corresponding to general formula (A) to from 0 to 2 mole percent.

Suitable additional diamines according to (2) are aliphatic diamines containing from 6 to 20 carbon atoms, preferably hexamethylene diamine and methylsubstituted hexamethylene diamines such as trimethyl hexamethylene diamines and also cycloaliphatic diamines such as 1,3-, 1,4-bis-aminomethyl cyclohexane or isophorone diamine, and araliphatic $C_7$–$C_{20}$ diamines, preferably m- and p-xylylene diamine, 2,5-dimethyl-p-xylylene diamine or 2,4-dimethyl-m-xylylene diamine. Hexamethylene diamine is preferably used as the amine component (2).

Particularly useful copolyamides according to the present invention are copolyamides produced by polycondensing equimolar quantities of:

(I) adipic acid and/or isophthalic acid optionally containing terephthalic acid in quantities of from 0 to 10 mole percent, and
(II) an amine mixture of:
1. from 5 to 100 mole percent of mixtures of cycloaliphatic amines consisting of:
   (a) from 0 to 0.5 mole percent of 4-aminodicyclohexylmethane,
   (b) from 90 to 99.5 mole percent of positionally isomeric diaminodicyclohexyl methanes with
   ($\alpha$) from 75 to 95% of 4,4'-isomers,
   ($\beta$) from 5 to 25% of 2,4'-isomers,
   ($\gamma$) from 0 to 1% of 2,2'-isomers,
   (c) from 0.1 to 2 mole percent of trinuclear triamines and higher homologs, and
2. from 0 to 95 mole percent of hexamethylene diamine, the sums of (1) and (2), (a) to (c) and ($\alpha$) to ($\gamma$) amounting to 100 mole percent of 100 percent in each case.

The mixtures of cycloaliphatic amines according to (1) which may be used for the production of the copolyamides according to the present invention may readily be obtained from aniline and formaldehyde, followed by hydrogenation of the aromatic polynuclear polyamines.

The quantity and relative ratio of monoamine according to (1a) and polyamine according to (1e) may be adjusted by distillation, the ratio of monoamine to polyamine having to be in the range of from 2:1 to 0.2:1.

The positional isomers of the mixture of cycloaliphatic amines in turn consist each of trans, trans-, cis, trans- and, to a minor extent, of cis, cis-isomers.

The cycloaliphatic amine mixtures are colourless to yellow highly viscous liquids. With increasing content of diamines, particularly 4,4'-diaminodicyclohexyl methanes, the mixtures begin to crystallise to an increasing extent.

In comparison with corresponding copolyamides produced only with 4,4'-diaminodicyclohexyl methane, the copolyamides according to the present invention show a reduced melt viscosity, particularly with low contents of polynuclear polyamines according to (1e), and hence better processibility.

In consequence of the relatively high molecular weight obtained by using the amine mixture, an improved toughness level is also obtained in addition to improved transparency.

Branched copolyamides distinguished by particular scratch resistance can be produced by correspondingly adapting the monoamine/triamine ratio.

The copolyamides are produced by the processes usually used for the production of polyamides from diamines and dicarboxylic acids. The mixture of the starting components may be heated to a temperature of from 190° to 230° C. and pre-condensed in this temperature range. On completion of this precondensation step, polycondensation is continued to completion at a temperature in the range of from 240° to 300° C.

Towards the end of the polymerisation reaction, condensation may be carried out in vacuo, although this is by no means necessary.

Precondensation may be carried out in the presence or absence of water; it may be carried out at atmospheric pressure or in closed autoclaves at the vapour pressure of the water.

Precondensation is preferably carried out in a closed autoclave in the presence of from 10 to 20% by weight of water. It is not necessary to carry out polycondensation starting from the salts of the monomers, particularly if precondensation is carried out in the presence of water.

The loss of diamine occurring during polycondensation is preferably compensated by using a corresponding excess of diamine.

The molecular weight of the polyamides may be regulated by a known method using carboxylic acids or amines.

The relative viscosity of the copolyamides according to the present invention should be above 2.2, preferably between 2.4 and 3.5, as measured on a 1% by weight solution of the polyamide in m-cresol at 25° C. in an Ubbelohde viscometer.

It is also possible to add to the polyamides according to the present invention various additives of the type used for standard polyamides, for example flameproofing agents, heat and UV stabilisers, antioxidants and pigments, the additions being made at any stage before or after polymerisation in accordance with established practice. Polyamides according to the present invention reinforced with from 10 to 50% by weight of glass fibres are also products of high quality.

The copolyamides according to the present invention show improved transparency for comparable molecular weights, a lower melt viscosity and hence better processibility in addition to the improved dimensional stability under heat characteristic of polyamides modified with cycloaliphatic components.

The copolyamides may be used for the production of various kinds of shaped articles, such as films, sheets and injection mouldings.

EXAMPLE 1

3.19 kg (21.8 moles) of adipic acid, 2.10 kg (18.1 moles) of hexamethylene diamine and 0.79 kg (3.76 moles, corresponding to approximately 17 mole percent of the diamine component) of hydrogenated amine mixture I are introduced into an autoclave together with 0.6 liter of water.

The contents of the autoclave are then heated under nitrogen to approximately 200° C., the stirrer being switched on at 100° C., and the reaction mixture is kept under its own pressure for 1 hour. The autoclave is then slowly vented, its contents heated to 270° C. and polycondensation carried out for 4 hours at 270° C.

The almost colourless polyamide formed ($\eta_{rel}$3.2,+) as measured on a 1% by weight solution in m-cresol at 25° C.) is spun off through a water bath, granulated and dried.

Standard small test bars produced from the material thus obtained show a dimensional stability under heat according to Vicat (Method B), DIN (Deutsche Industrienorm) 53 460, of 206° C. and a notched impact strength of 4.4 kJ/m$^2$ according to DIN 53 453. Impact strength testing in accordance with DIN 53 453 did not produce any breakages in 10 test specimens.

Composition of the hydrogenated amine mixture I:
0.1% of 4-aminodicyclohexyl methane,
94.4% of 4,4'-diaminodicyclohexyl methanes,
5.0% of 2,4'-diaminodicyclohexyl methanes,
0.2% of 2,2'-diaminodicyclohexyl methanes,
0.3% of cycloaliphatic trinuclear triamines.

EXAMPLE 2

Following the procedure of Example 1, a polyamide is produced from 1.66 kg (8.8 moles) of azelaic acid 1.46 kg (10.0 moles) of adipic acid, 1.79 kg (10.8 moles) of isophthalic acid and 6.30 kg (30.0 moles) of hydrogenated amine mixture I. The almost colourless transparent polyamide had a relative viscosity of 2.8,+) a dimensional stability under heat of 184° C. and a notched impact strength of 3.9 kJ/m². Impact strength testing resulted in the breakage of only one out of ten test specimens (at 95.4 kJ/m²).

EXAMPLE 3

Following the procedure of Example 1, a polyamide is produced from 4.65 kg (31.3 moles) of adipic acid, 2.50 kg (21.6 moles) of hexamethylene diamine and 2.06 kg (9.7 moles) of hydrogenated amine mixture I. The almost colourless, high-gloss product has a relative viscosity of 2.9+) and a dimensional stability under heat according to Vicat (Method B) of 176° C. its notched impact strength amounting to 5.9 kJ/m². Impact strength testing did not produce any breakages in 10 test specimens.

The polyamide which is transparent in layer thicknesses of up to 1.5 mm can be processed better and more quickly in standard injection-moulding machines than polyamide-6,6 of comparable relative viscosity.

EXAMPLE 4

3.38 kg (18 moles) of azelaic acid, 1.98 kg (17.1 moles) of hexamethylene diamine and 0.2 kg (0.95 mole, i.e. approximately 5 mole percent of the amine component) of hydrogenated amine mixture (I) are weighed into an autoclave together with 20 g of benzoic acid as a molecular weight regulator and 0.5 liter of water, followed by polycondensation in the same way as described in Example 1.

The almost colourless polyamide which is transparent in layer thicknesses of up to 3 mm has a relative viscosity of 3.3+) a dimensional stability under heat of 159° C. and a notched impact strength of 5.6 kJ/m². Impact strength testing did not produce any breakages in 10 test specimens.

EXAMPLE 5

3.2 kg (19.3 moles) of isophthalic acid, 1.93 kg (16.6 moles) of hexamethylene diamine and 0.63 kg (3.0 moles, i.e. approximately 15 mole percent of the amine component) of hydrogenated amine mixture (I) are polycondensed in the same way as described in Example 4.

The pale yellow transparent polyamide obtained has a relative viscosity of 2.5+) a dimensional stability under heat of 144° C. and a notched impact strength of 3.9 kJ/m². Impact strength testing did not produce any breakages in 10 test specimens.

If 4,4'-diaminodicyclohexylmethane is used instead of the hydrogenated amine mixture (I), a transparent polyamide having a relative viscosity of 2.4, a dimensional stability under heat of 143° C. and a notched impact strength of 3.5 kJ/m² is obtained.

EXAMPLE 6

The procedure is as described in Example 4, except that the hydrogenated amine mixture I is replaced by a hydrogenated amine mixture II having the following composition:
0.4% of 4-aminodicyclohexyl methane
93.1% of 4,4'-diaminodicyclohexyl methanes
4.8% of 2,4'-diaminodicyclohexyl methanes
0.2% of 2,2'-diaminodicylcohexyl methanes
1.5% of cycloaliphatic trinuclear triamines The polyamide obtained is almost colourless and has a relative viscosity of 3.7+) a dimensional stability under heat of 160° C. and a notched impact strength of 5.4 kJ/m². Impact strength testing did not produce any breakages in 10 test specimens.

EXAMPLE 7

The procedure is as described in Example 3, except that the hydrogenated amine mixture I is replaced by a hydrogenated amine mixture III having the following composition:
88.5% of 4,4'-diaminodicyclohexyl methanes
11.0% of 2,4'-diaminocyclohexyl methanes
0.5% of 2,2'-diaminocyclohexyl methanes
The polyamide obtained is transparent in layer thickness of up to 2.5 mm, has a relative viscosity of 2.8+) a dimensional stability under heat of 172° C. and a notched impact strength of 5.5 kJ/m². Impact strength testing did not produce any breakages in 10 test specimens.

We claim:

1. A thermoplastic copolyamide consisting essentially of a polymeric condensation product of equimolar quantities of:
(I) at least one member selected from the group consisting of aliphatic dicarboxylic acids having from 2 to 20 carbon atoms and aromatic dicarboxylic acids having from 7 to 20 carbon atoms and
(II) an amine mixture comprising:
  (1) from 0.1 to 100 mole percent of a mixture of cycloaliphatic amines consisting of
    (a) from 0 to 3 mole percent of 4-aminodicyclohexyl methane,
    (b) from 70 to 99 mole percent of 4,4'-diaminodicyclohexyl methane,
    (c) from 1 to 30 mole percent of 2,4'-diaminodicyclohexyl methane,
    (d) from 0 to 2 mole percent of 2,2'-diaminodicyclohexyl methane and
    (e) from 0 to 15 mole percent of a polynuclear polyamine of the formula

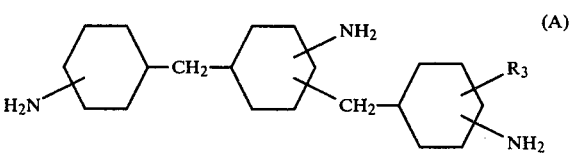 (A)

wherein $R_3$ is hydrogen or

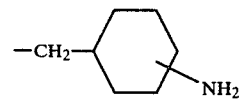

and
  (2) from 0 to 99.9 mole percent of one or more aliphatic diamines or cycloaliphatic diamines other than defined in (1) and having at least 6 carbon atoms,
the sum of each of (1) and (2) and of (a) to (e) being 100 mole percent.

2. A copolyamide as claimed in claim 1 wherein component I is at least one member selected from the group consisting of adipic acid and isophthalic acid, and 0 to 10 mole percent of terephthalic acid.

3. A copolyamide as claimed in claim 1 wherein component (1) consists of
   (a) from 0 to 0.5 mole percent of 4-aminodicyclohexyl methane,
   (b) from 90 to 99.5 mole percent of positionally isomeric diaminodicylohexyl methanes with from 75 to 95 mole percent of 4,4'-isomers from 5 to 25 mole percent of 2,4'-isomers from 0 to 2 mole percent of 2,2'-isomers and
   (c) from 0 to 2 mole percent of one or more trinuclear and polynuclear amines corresponding to formula (A).

4. A copolyamide as claimed in claim 1, wherein hexamethylene diamine is used as component (2).

5. A copolyamide as claimed in claim 1 wherein the amine mixture II consists of from 0.5 to 20 mole percent of component (1) and from 80 to 99.5 mole percent of component (2).

6. A copolyamide as claimed in claim 1 wherein the amine mixture II consists of from 70 to 100 mole percent of component (1) and from 0 to 30 mole percent of component (2).

7. A shaped article of a copolyamide as claimed in claim 1.

* * * * *